United States Patent
Karanan et al.

(10) Patent No.: US 10,664,338 B2
(45) Date of Patent: May 26, 2020

(54) SYSTEM AND METHOD FOR ROOT CAUSE ANALYSIS IN LARGE SCALE DATA CURATION FLOWS USING PROVENANCE

(71) Applicant: International Business Machines Corporation, Armonk, NY (US)

(72) Inventors: Hima P. Karanan, Bangalore (IN); Manish Kesarwani, Bangalore (IN); Salil Joshi, Bangalore (IN); Mohit Jain, Bangalore (IN); Sameep Mehta, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 15/838,948

(22) Filed: Dec. 12, 2017

(65) Prior Publication Data
US 2019/0179689 A1    Jun. 13, 2019

(51) Int. Cl.
G06F 11/07        (2006.01)
G06Q 10/04        (2012.01)
G06Q 10/06        (2012.01)

(52) U.S. Cl.
CPC .......... *G06F 11/079* (2013.01); *G06Q 10/04* (2013.01); *G06Q 10/0637* (2013.01); *G06Q 10/0633* (2013.01)

(58) Field of Classification Search
CPC combination set(s) only.
See application file for complete search history.

(56) References Cited

U.S. PATENT DOCUMENTS

| 8,903,760 B2 | 12/2014 | DeVries et al. |
| 9,542,412 B2* | 1/2017 | Bates-Haus ........... G06F 16/215 |
| 2006/0117238 A1* | 6/2006 | DeVries .................. G06F 19/36 |
| | | 714/746 |
| 2010/0114628 A1 | 5/2010 | Adler et al. |
| 2010/0114629 A1 | 5/2010 | Adler et al. |

(Continued)

OTHER PUBLICATIONS

B. Lucia et al., "Data Provenance Tracking for Concurrent Programs," Proceedings of the 13th Annual IEEE/ACM International Symposium on Code Generation and Optimization (CGO), Feb. 7-11, 2015, pp. 146-156.

(Continued)

*Primary Examiner* — Amine Riad
(74) *Attorney, Agent, or Firm* — Ryan, Mason & Lewis, LLP

(57) ABSTRACT

Methods, systems and computer program products for root cause analysis using provenance data are provided herein. A computer-implemented method comprises computing a plurality of provenance paths for at least one of a plurality of data elements in a curation flow and a plurality of groups of data elements in the curation flow, analyzing the computed provenance paths to determine one or more errors in the curation flow, and outputting the one or more errors in the curation flow to at least one user. The analyzing comprises at least one of identifying which of the computed provenance paths are partial provenance paths, and identifying one or more output records associated with the curation flow, wherein the one or more output records comprise incorrectly curated data, and identifying the computed provenance paths that respectively correspond to the one or more output records comprising the incorrectly curated data.

18 Claims, 7 Drawing Sheets

(56) References Cited

U.S. PATENT DOCUMENTS

| | | | |
|---|---|---|---|
| 2016/0028845 A1* | 1/2016 | Barr | G06F 11/0751 |
| | | | 714/37 |
| 2017/0075918 A1* | 3/2017 | Bates-Haus | G06F 16/215 |
| 2019/0043528 A1* | 2/2019 | Humphrey | G10L 25/51 |
| 2019/0156576 A1* | 5/2019 | Ndolo | G06T 19/006 |
| 2019/0171620 A1* | 6/2019 | McCollum | G06F 16/176 |

OTHER PUBLICATIONS

D. Zinn et al., "Abstract Provenance Graphs: Anticipating and Exploiting Schema—Level Data Provenance," International Provenance and Annotation Workshop (IPAW), Provenance and Annotation of Data and Processes, 2010, pp. 206-215.

Tianhong Song, "Design and Analysis of Data Curation Workflows," Dissertation, University of California, Office of Graduate Studies, 2016, 20 pages.

Wikipedia, "Provenance," https://en.wikipedia.org/wiki/Provenance#Computer_science, Nov. 9, 2017, 11 pages.

P. Missier et al., "Linking Multiple Workflow Provanance Traces for Interoperable Collaborative Science," 5th Workshop on Workflows in Support of Large-Scale Science (WORKS), Dec. 17, 2010, 8 pages.

T. Song et al., "Towards Automated Design, Analysis and Optimization of Declarative Curation Workflows," International Journal of Digital Curation, Feb. 26, 2014, pp. 111-122, vol. 9, No. 2.

\* cited by examiner

SYSTEM AND METHOD FOR ROOT CAUSE ANALYSIS IN LARGE SCALE DATA CURATION FLOWS USING PROVENANCE

FIELD

The present invention relates to the identification of errors in data curation flows, and more specifically, to techniques which use provenance for root cause analysis in large scale data curation flows.

BACKGROUND

Data curation involves creating knowledge from structured, semi-structured, and/or unstructured data sources. Large scale data curation flows involve multiple steps in which data from different sources are extracted, transformed, and linked with other sources to create meaningful knowledge.

Experience shows that curation flows for unstructured and semi-structured sources are complex. In a non-limiting example, in the financial domain, a curation flow may include 15 to 20 stages for handling 3 data sources and curating 15 concepts and their relationships.

Each stage in a curation flow can require, for example, about 10 seconds to about 100 seconds to be performed. Additionally, each stage includes multiple rules and/or algorithms that extract, transform, and/or link data in a meaningful way to create knowledge that can be consumed by various applications.

Given the complexity of large scale data curation flows, identifying problems in the flows and maintaining data quality is challenging. Accordingly, improved systems and techniques for identifying issues in a large scale data curation flow are needed.

SUMMARY

Embodiments of the invention provide techniques for root cause analysis, and more particularly, to using provenance path data to determine errors in data curation workflows.

According to an exemplary embodiment of the present invention, a computer-implemented method comprises computing a plurality of provenance paths for at least one of a plurality of data elements in a curation flow and a plurality of groups of data elements in the curation flow, analyzing the computed provenance paths to determine one or more errors in the curation flow, and outputting the one or more errors in the curation flow to at least one user. The analyzing comprises at least one of identifying which of the computed provenance paths are partial provenance paths, and identifying one or more output records associated with the curation flow, wherein the one or more output records comprise incorrectly curated data, and identifying the computed provenance paths that respectively correspond to the one or more output records comprising the incorrectly curated data.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
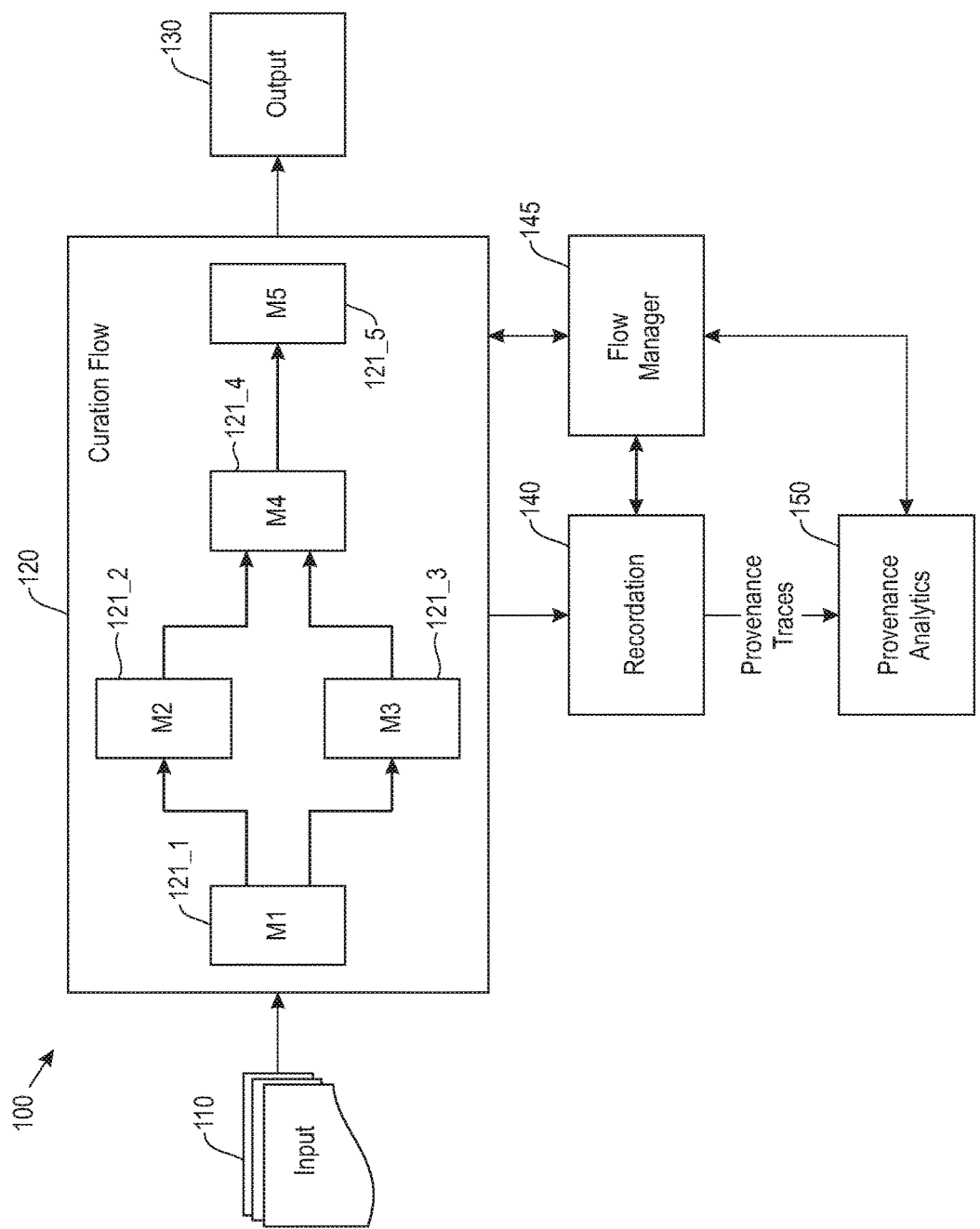
FIG. 1 is a block diagram of a system for root cause analysis in data flows, according to an exemplary embodiment of the present invention.

Illustrative embodiments of the invention may be described herein in the context of illustrative methods, systems and devices for root cause analysis in large scale data curation flows using provenance. However, it is to be understood that embodiments of the invention are not limited to the illustrative methods, systems and devices but instead are more broadly applicable to other suitable methods, systems and devices.

As used herein, "large scale" means very large data sets, such as, for example, on the order of terabytes (TB) or petabytes (PB) in size, obtained from multiple sources.

As used herein, "provenance" or "data provenance" means the lineage of data, including processes performed on the data and agents, such as, but not necessarily limited to, hardware and software agents, that perform the processes. The terms "provenance" and "data provenance" can also refer to the tracing and recording of the origins of data and its movement between locations, such as, but not necessarily limited to, databases, applications, devices, etc.

In accordance with an aspect of the present invention, provenance can be divided into two parts, "source" provenance and "how" provenance.

Source provenance identifies from which source a particular data element is coming, along with span. Span refers to the actual position from where a certain fact is extracted in a document, such as the starting position of the fact (e.g., position of the first character of the extracted fact relative to the start of the document) and end position of the fact in the document. For example, if the document has content such as "root cause analysis in large scale data curation" and if the word scale is our extracted fact, then its span is (30, 34), where 30 is the start character position of the word scale and 34 is the end position of the word in the above sentence. Embodiments of the present invention can enable curation flows to record details at this level to trace back and debug.

How provenance identifies the different transformations that data are subjected to in various stages in data curation flow. For example, as explained further herein below, how provenance corresponds to which modules and associated rules operate on the data.

As used herein, a "data element" can refer to, but is not necessarily limited to, a data attribute and/or data record. A data element in case of curation flows can be an unstructured document and/or a simple record like in a relational database, with few attribute values or a semi-structured document like XML/JSON, with some structure and values.

Illustrative embodiments disclosed herein can provide a number of significant advantages relative to conventional arrangements.

In accordance with an aspect of the present invention, capturing provenance at detailed levels helps in root cause analysis to address quality issues and identify bugs in data curation flows. Debugging complex data curation flows without using provenance can be very time consuming, requiring more computing power and computing resources and/or manual intervention to identify problematic blocks and problematic rules within the problematic blocks. Debugging complex data curation flows without using provenance also requires more computing power, computing resources and manual resources to develop a fix for any identified quality issues or errors.

One or more embodiments provide enhanced performance and scalability for root cause analysis. Limitations associated with conventional root cause analysis implementations are effectively removed using techniques disclosed herein. These include limitations corresponding to the large amount of time needed to analyze a curation workflow, and the number of data sources that can be supported for a desired performance level. Illustrative embodiments can therefore provide significantly improved performance and scalability relative to conventional root cause analysis implementations. Illustrative embodiments are also capable of more efficiently handling large-scale data curation flows relative to conventional root cause analysis implementations.

Some embodiments advantageously avoid excessive processing delays such as those associated with conventional root cause analysis engines that debug complex data curation flows without using provenance. Such conventional techniques typically have delays higher than those in one or more embodiments described herein.

Additionally, some embodiments advantageously use new alternative processes which automatically identify and fix problematic issues, which save developer time by avoiding manual processes for identifying and repairing the issues. With the embodiments of the invention, new automated processes identify and fix problems with the curation flows and pro-actively notify users of problematic records and/or modules.

When problematic records exist, some embodiments provide an advantage of automatically using similar non-problematic records to find the possible provenance traces causing the problems, and point a user to modules and rules that can help identify the root cause of the problems.

As used herein, "provenance path" or "provenance trace" means the origin and processing history of a data element or plurality of data elements based on computational workflow steps, which describe data transformation and generation. As used herein, "provenance path" or "provenance trace" is further defined as a set of (Mi,Ri), where Mi is a module i in the data curation flow, Ri is a rule i within that module, and i is an integer. For a given data flow, a set of respective provenance paths can be computed based on the number of input data elements (or groups of data elements) and the number of output data elements (or groups of data elements) at each module. For example, if a data element d passes through modules M1, M2, and M3 and produces output data element d', then the provenance path for data element d to data element d', will include the modules M1, M2 and M3 for the given data path, along with the rules within each module. A non-limiting example of a provenance path includes module M1 with rules R1 and R3 in module M1, a module M2 with rules R2 and R8 in module M2, and a module M3 with rule R2 in module M3, which can be represented as {(M1,R1), (M1,R3), (M2,R2), (M2,R8), (M3, R2)}. Depending on the circumstances, provenance paths may be different or overlap in some or all respects between respective data elements or respective groups of data elements.

As used herein, "module" means a process block used to compute certain output from a given data record. A module can be a simple transformation module, for example, where given text data, the module changes the text case to upper case. Alternatively, a module can be an address extraction module, where given set of documents, the module identifies and outputs addresses present in those documents.

Embodiments of the present invention can analyze provenance, and provenance paths/traces in connection with one or more data elements and/or one or more groups or sets of data elements. Embodiments of the present invention provide methods for identifying potentially different data elements/curation rules or gaps in the curation process using pro-active root cause analysis. Embodiments of the present invention also use reactive root cause analysis to identify differences in the provenance paths associated with faulty and non-faulty records and identify the potentially faulty modules and/or rules that could have caused the issue.

In accordance with embodiments of the present invention, provenance paths for a given workflow and dataset are computed, and source and how provenance data, along with labeled curated outputs, are used identify modules and/or rules which require correction in a complex large-scale curation flow. Embodiments of the present invention further analyze provenance traces for various attributes and/or concepts on large amounts of data (e.g., terabytes or petabytes) to identify outliers for further inspection and correction.

FIG. 1 is a block diagram of a system for root cause analysis in data flows, according to an exemplary embodiment of the present invention. As shown in FIG. 1 by lines and/or arrows, the components of the system 100 are operatively coupled to each other via, for example, physical connections, such as wired and/or direct electrical contact connections, and/or wireless connections, such as, for example, Wi-Fi™, BLUETOOTH®, IEEE 802.11, and/or networks, including but not limited to, a local area network (LAN), wide area network (WAN), cellular network, ad hoc networks, WANET, satellite network or the Internet.

Referring to FIG. 1, a curation flow 120 includes modules M1, M2, M3, M4 and M5 121_1, 121_2, 121_3. 121_4 and 121_5. The number of modules is not necessarily limited to what is shown in FIG. 1, and embodiments of the invention may apply to systems with more or less modules in varied configurations. Input data 110 including data elements d may pass through, for example, modules M1, M2, M4 and M5 121_1, 121_2, 121_4 and 121_5 or modules M1, M3, M4 and M5 121_1, 121_3. 121_4 and 121_5, and emerge as output data 130 including data elements d'. Provenance paths (or provenance traces) of the data elements d (and/or groups of data elements) in the curation flow 120 are recorded by a recordation component 140 and sent to a provenance analytics component 150, which computes and analyzes a plurality of respective provenance paths for a given data set or curation workflow comprising the data elements and/or groups of data elements. The plurality of respective provenance paths are based on the number of input data elements (or groups of data elements) and output data elements (or groups of data elements) at each module. For example, referring to FIG. 1, if a data element $d_1$ of a data set passes through modules M1, M2, M4 and M5 and produces output data element $d_1'$, then the provenance path for data element $d_1$ to data element $d_1'$ computed by the provenance analytics component 150 will include the modules M1, M2, M4 and M5 for the given data path, along with the rules within each module. If another data element $d_2$ of a data set passes through modules M1, M3, M4 and M5 and produces output data element $d_2'$, then the provenance path for data element $d_2$ to data element $d_2'$ computed by the provenance analytics component 150 will include the modules M1, M3, M4 and M5 for the given data path, along with the rules within each module. In accordance with an embodiment of the present invention, the provenance analytics component 150 computes and analyzes the provenance paths for each data element and or group of data elements of a given data set or curation workflow.

Figure 2:
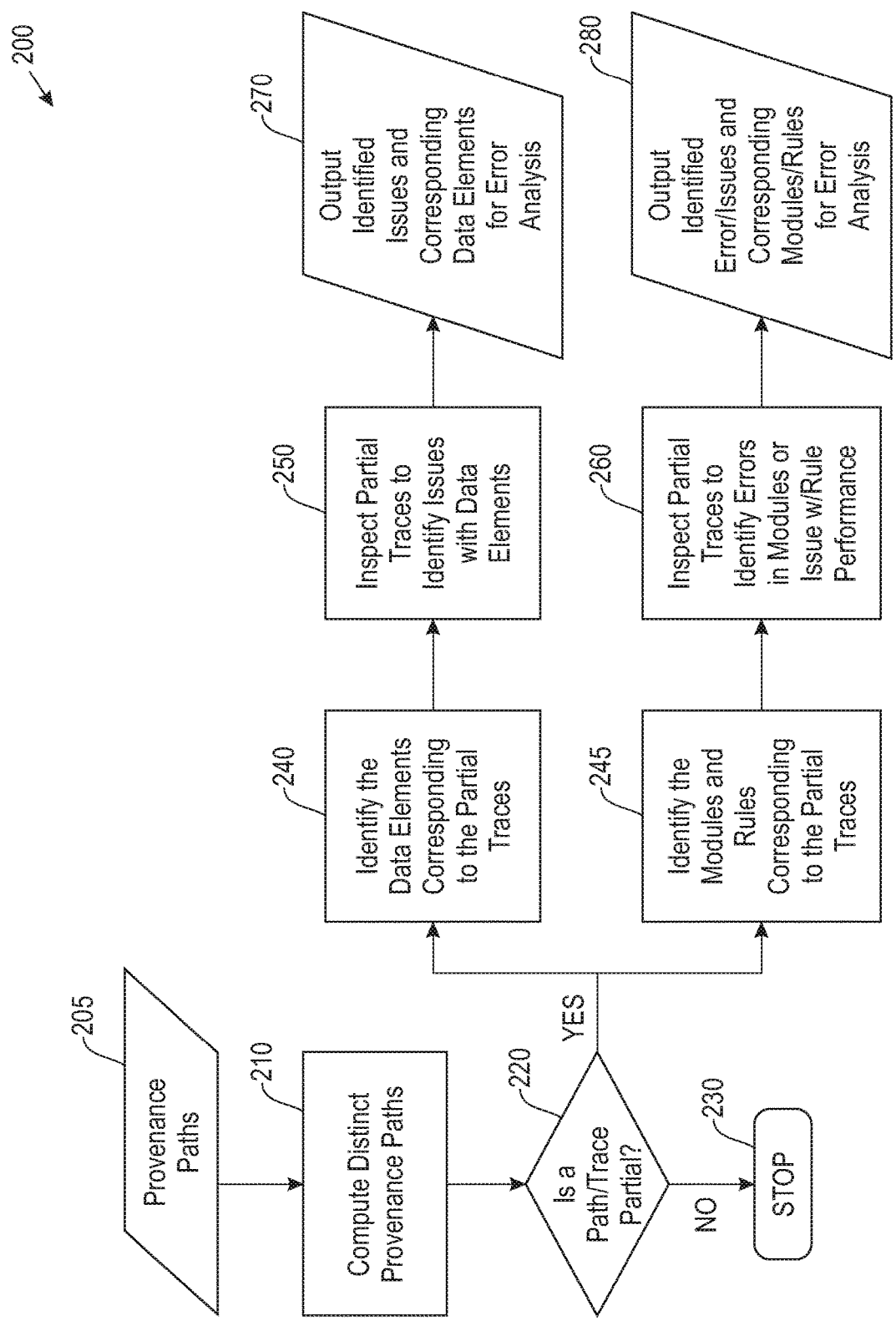
FIG. 2 illustrates a flow diagram illustrating a process for pro-active root cause analysis, in accordance with an embodiment of the present invention.

FIG. 2 illustrates a flow diagram illustrating a process 200 for pro-active root cause analysis, in accordance with an embodiment of the present invention. In accordance with an embodiment of the present invention, a plurality of provenance paths 205 are recorded, for example, by the recordation component 140. Referring to blocks 210 and 220, given the plurality of provenance paths 205, all respective provenance paths for a given data set and/or a curation workflow are computed and analyzed. For example, the provenance path for each data element and/or each group of data elements in a data set and/or curation workflow can be computed and analyzed by the provenance analytics component 150.

In accordance with an embodiment of the present invention, a data curation flow manager 145, which can be an independent component or part of recordation component 140 and/or provenance analytics component 150, along with instrumentation at each module, can be used to gather provenance flows. In certain systems provenance is added as additional attribute to each data record by each module with its signature.

Referring to block 220, the provenance paths are analyzed to determine which of the paths are partial. In other words, the provenance paths are analyzed to determine which paths are not complete and resulted in gaps in and/or unintended stoppage of processing. The processing includes, for example, data movement, migration, transformation and/or other data processing which has stopped at an intermediate stage of a computational workflow prior to achieving an intended result.

In a non-limiting illustrative example, in connection with determining whether a provenance path is partial, suppose 100 records with 2 attributes each are input to module M1 121_1 and 100 modified records with 3 attributes each are expected to be output from module M1 121_1, but 95 records with 3 attributes each and 5 records with only 2 attributes each are output. Those 5 records were either not operated on by the module M1 121_1 or the required information to be acted on by the module M1 121_1 is not present in the 5 records. Even though they were input into module M1, the 5 records will have partial provenance since the 5 records were not acted by any of the rules to create the additional attribute.

In another non-limiting illustrative example, 100 records are input to a module and 100 records are expected to be output from the module, but only 90 records are output. The remaining 10 records that are not transmitted to the next module have partial provenance since the remaining 10 records do not traverse the full flow.

Referring to block 230, for provenance paths that are determined to be complete (e.g., not partial), further analysis is not performed. Referring to blocks 240 and 245, for provenance paths determined to be partial, the data element(s) or group of data elements corresponding to the partial trace are identified, and the modules and rules corresponding to the partial trace are identified. At blocks 250 and 260, the partial traces are inspected to identify data issues or errors in modules, including issues with rule performance. For example, if a provenance path ends at an intermediate stage of a workflow, then there could be an issue with a data element or group of data elements and/or an issue with the application of rules associated with the data element or group of data elements. Examples of problems with a data element or group of data elements include, but are not necessarily limited to: (i) the information being sought is not present in the data element or group of data elements, and (ii) the data element or group of data elements are not in their specified locations. Examples of problems with curation rules or algorithms include, but are not necessarily limited to: (i) rules and/or algorithms that do not correspond to the data element(s) or group of data elements, or the information therein, (ii) a lack of updates to the rules or algorithms, and (iii) incomplete performance of a rule or algorithm.

Referring to blocks 270 and 280, the identified data issues and errors in modules, along with the corresponding data elements and/or modules and rules, are output for error analysis. The output can be to an analytics component, which can automatically perform an error analysis and implement and/or recommend solutions to remove the identified data issues and errors. Error analysis can include an output of problematic modules along with which data elements the problematic modules did not process.

Alternatively, the output can be to a user device, where a user can view the identified issues and errors through an appropriate interface, perform the error analysis, and implement and/or recommend solutions to remove the identified data issues and errors. This pro-active root cause analysis enables identification of any problematic rules and/or data patterns that need to be addressed prior to subsequent execution of another workflow.

Figure 3:
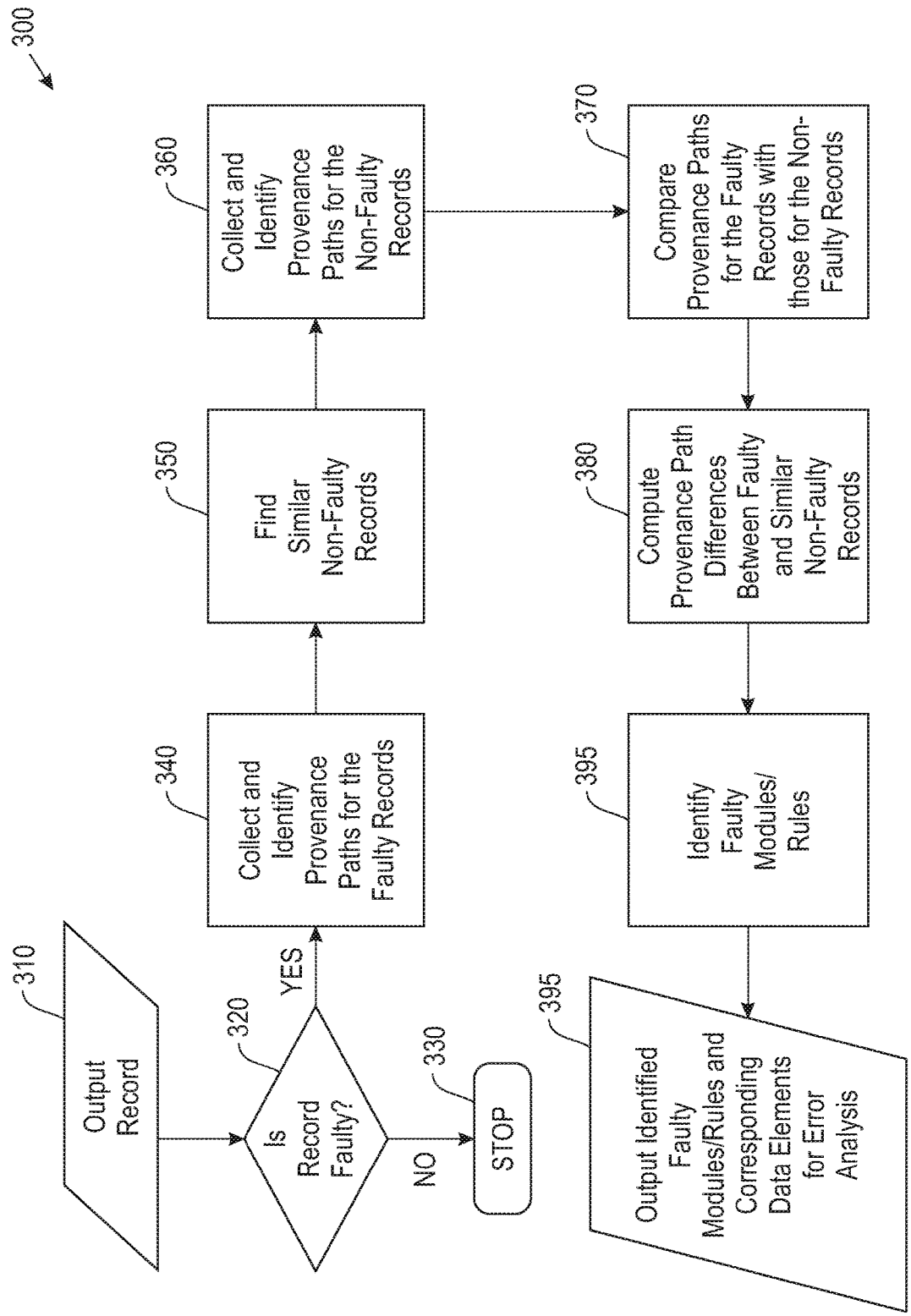
FIG. 3 illustrates a flow diagram illustrating a process for reactive root cause analysis, in accordance with an embodiment of the present invention.

FIG. 3 illustrates a flow diagram illustrating a process 300 for reactive root cause analysis, in accordance with an embodiment of the present invention. In accordance with an embodiment of the present invention, an output record 310 includes a record of data elements which have passed through a provenance path and produced output data elements for a data curation workflow. The provenance path includes, for example, a plurality of modules applying rules and/or algorithms to the data elements (see, e.g., FIG. 1, where input data 110 including data elements pass through, for example, modules and emerge as output data 130 including output data elements).

Referring to block 320, it is determined whether the output records are faulty records (e.g., records which comprise incorrectly curated data). Depending on complexity, this determination can be automated, or performed manually by a user labeling the faulty records. In a non-limiting example, in connection with determining whether a record is faulty, suppose a module extracts an address of a company from a regulatory filing, wherein the address includes a building number, street, city, country and zip code. For certain companies missing information in the extracted address, such as a city, these records can be considered faulty. In this case, identifying which rules in a module pertain to the omitted information may be relatively simple, and manually performed. However, in a more complex case, multiple modules may compute each of the attributes for the address using different rules, and some modules combine the computed attributes to obtain the final output. In addition to the simpler case, embodiments of the present invention can automatically identify which module(s) and rule(s) among those in the more complex case can be causing the problems for a given faulty record.

Referring to block 330, if a record is not found to be faulty, further analysis is not performed on that record. Referring to block 340, provenance paths for the faulty records are collected and identified (e.g., by the recordation component 140). Then, referring to block 350, the system determines those records that are similar to the faulty records, but are not faulty (e.g., correct). The similar records correspond to data that have been correctly curated. Similar records can be identified by looking at documents coming from similar sources and/or similar input data. Referring to block 360, the provenance paths for the non-faulty (e.g., correctly curated) records are collected and identified (e.g., by the recordation component 140).

Referring to block 370, the provenance paths from the faulty records are compared with the provenance paths of the similar correctly curated records, and at block 380, the differences in the provenance paths followed by the data in the faulty and similar non-faulty records are computed. In a relatively simple case for purposes of explanation, given provenance traces for faulty and non-faulty records, differences are found between the paths. For example, Trace1={(m1,r1),(m2,r3),(m4,r5)} and Trace2={(m1,r1),(m2,r6), (m4,r5)}. As can be seen, Trace1 and Trace2 have hit different rules in module m2. Accordingly, differences in module 2 between Trace1 and Trace2 are identified. As noted, the preceding is a very simplistic case for purposes of explanation. Traces can be very complicated, and embodiments of the present invention include more complex and efficient algorithms to find difference and fault.

Then, at block 390, using the differences, the potentially faulty modules and/or rules that could have caused the issues are identified. For example, a point of diversion between faulty and non-faulty provenance paths may indicate faulty modules and/or rules at that point. Referring to block 395, the identified potentially faulty modules and/or rules, along with the corresponding data elements, are output for error analysis to determine why the modules and/or rules are faulty. In accordance with an embodiment of the present invention, error analysis, which can be performed automatically or by a user, includes an examination of the identified potentially faulty modules and/or rules to fix the noted issues as opposed to manually looking at all the modules one by one for different records.

Figure 4:
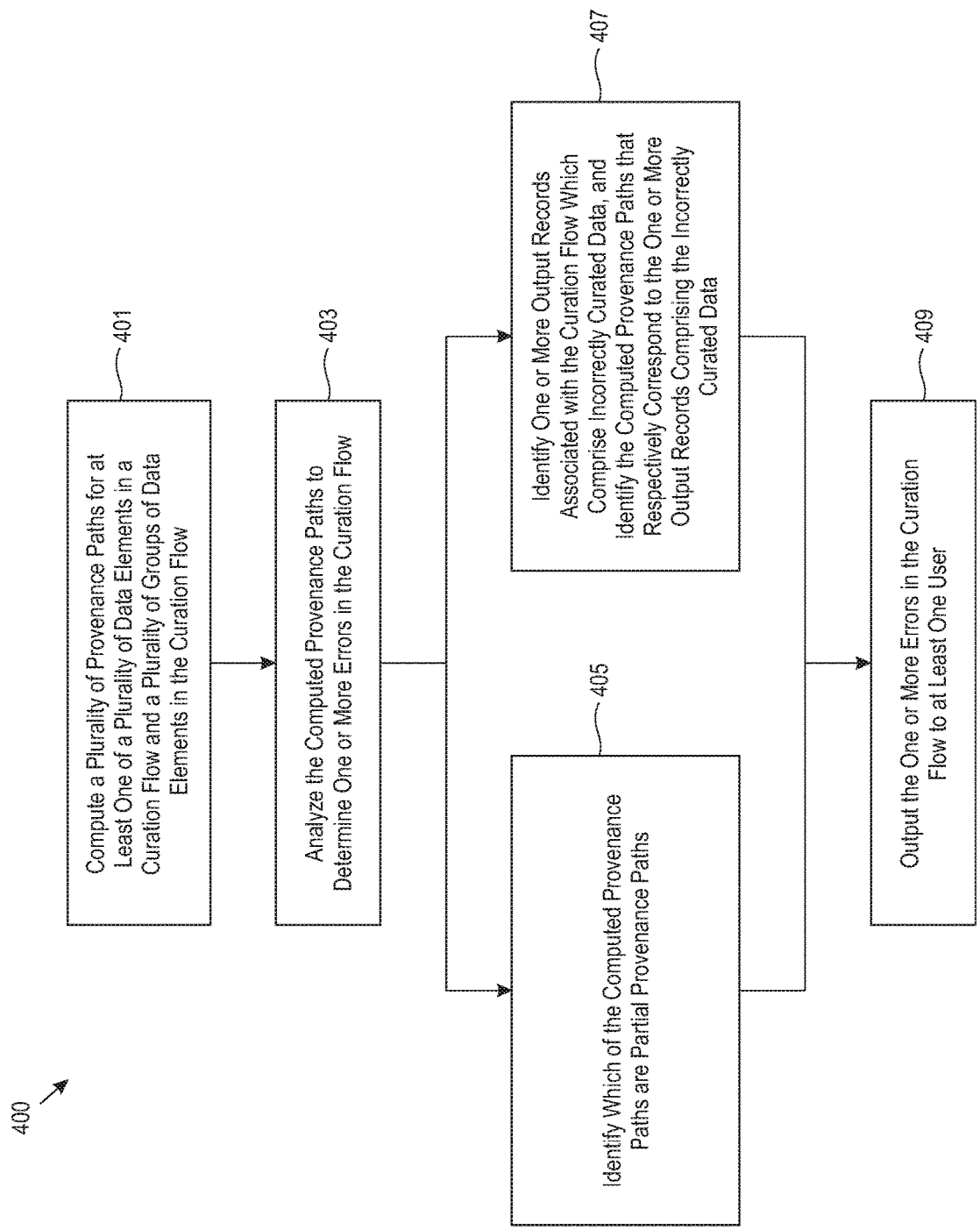
FIG. 4 depicts a process for root cause analysis in data flows, according to an exemplary embodiment of the present invention.

FIG. 4 is a flow diagram of a process for root cause analysis in data flows, according to an exemplary embodiment of the invention. Referring to FIG. 4, the process 400 includes, at block 401, computing a plurality of provenance paths for at least one of a plurality of data elements in a curation flow and a plurality of groups of data elements in the curation flow. The plurality of provenance paths include a plurality of modules, and the plurality of modules each include one or more rules acting on the data elements and/or groups of data elements. The plurality of provenance paths are based on a number of input data elements and output data elements at each module of the plurality of modules.

Referring to block 403, the process 400 further includes analyzing the computed provenance paths to determine one or more errors in the curation flow. The analyzing can comprise identifying which of the computed provenance paths are partial provenance paths (block 405) and/or identifying one or more output records associated with the curation flow, wherein the output records comprise incorrectly curated data, and identifying the computed provenance paths that respectively correspond to the one or more output records comprising the incorrectly curated data (block 407). Referring to block 409, the one or more errors in the curation flow are outputted to at least one user.

The analyzing may further comprise identifying one or more modules in the flow which are problematic or need to be extended. For example, the analyzing may comprise identifying the plurality of modules and the one or more rules that respectively correspond to the partial provenance paths, and/or identifying at least one of the plurality of data elements and the plurality of groups of data elements that respectively correspond to the partial provenance paths. The partial provenance paths are inspected to identify one or more problems with at least one of the corresponding plurality of modules and the one or more rules, and/or one or more problems with the corresponding plurality of data elements and the plurality of groups of data elements.

The analyzing may further comprise identifying one or more output records comprising correctly curated data, and determining the one or more output records comprising the correctly curated data that are similar to the one or more output records comprising the incorrectly curated data. The analyzing may then comprise identifying the computed provenance paths that respectively correspond to the one or more output records comprising the correctly curated data and which were determined to be similar.

The computed provenance paths that respectively correspond to the one or more output records comprising the incorrectly curated data are compared with the computed provenance paths that respectively correspond to the one or more output records comprising the correctly curated data which were determined to be similar. The differences are computed between the computed provenance paths corresponding to the one or more incorrect output records and the computed provenance paths corresponding to the one or more similar correct output records. The analyzing may further comprise identifying one or more problems with a module and/or a rule based on the computed differences.

The identified one or more problems are outputted, and an error analysis is performed on the identified one or more problems.

The present invention may be implemented via a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
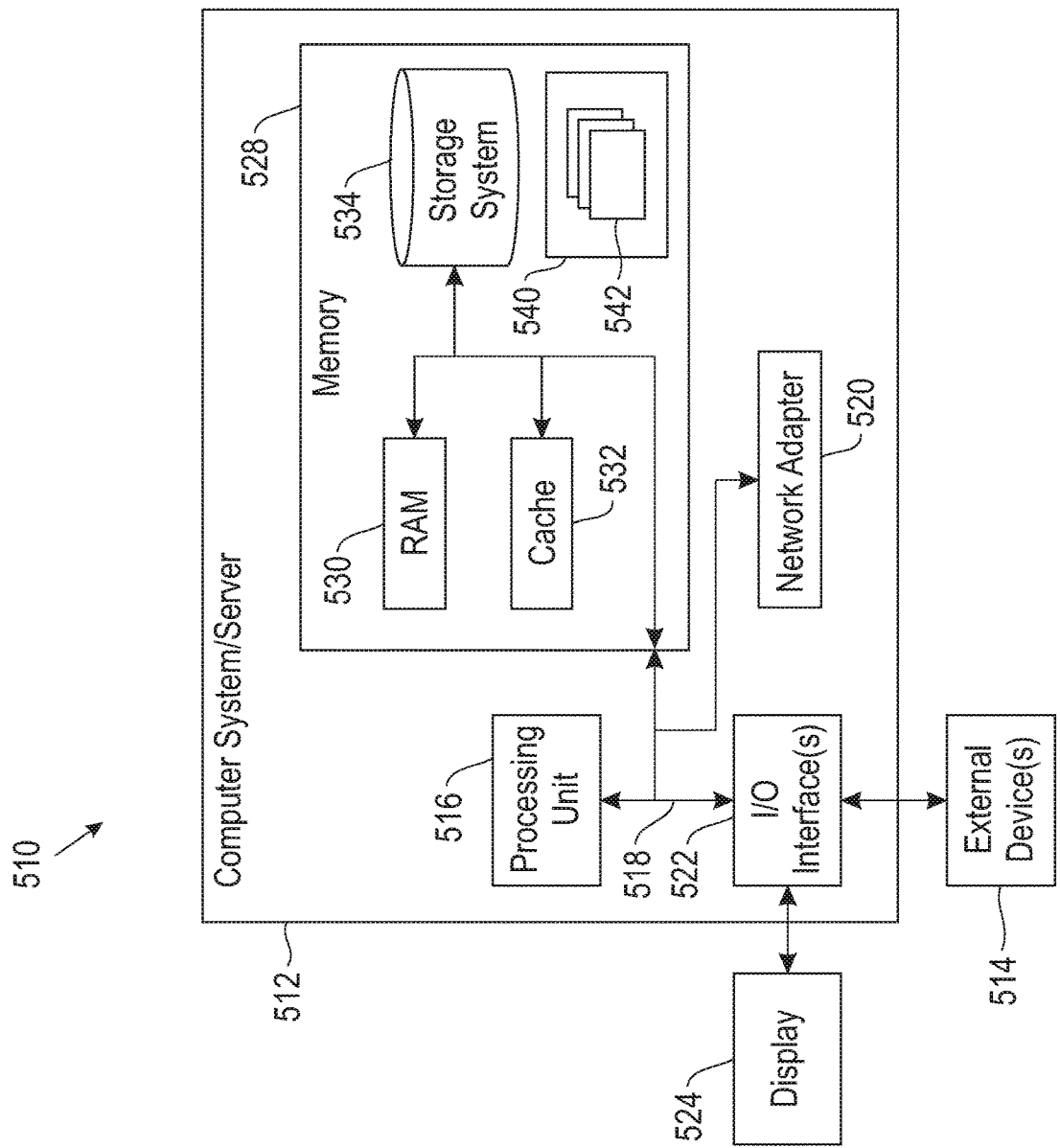
FIG. 5 depicts a computer system in accordance with which one or more components/steps of techniques of the invention may be implemented, according to an exemplary embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as RAM 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
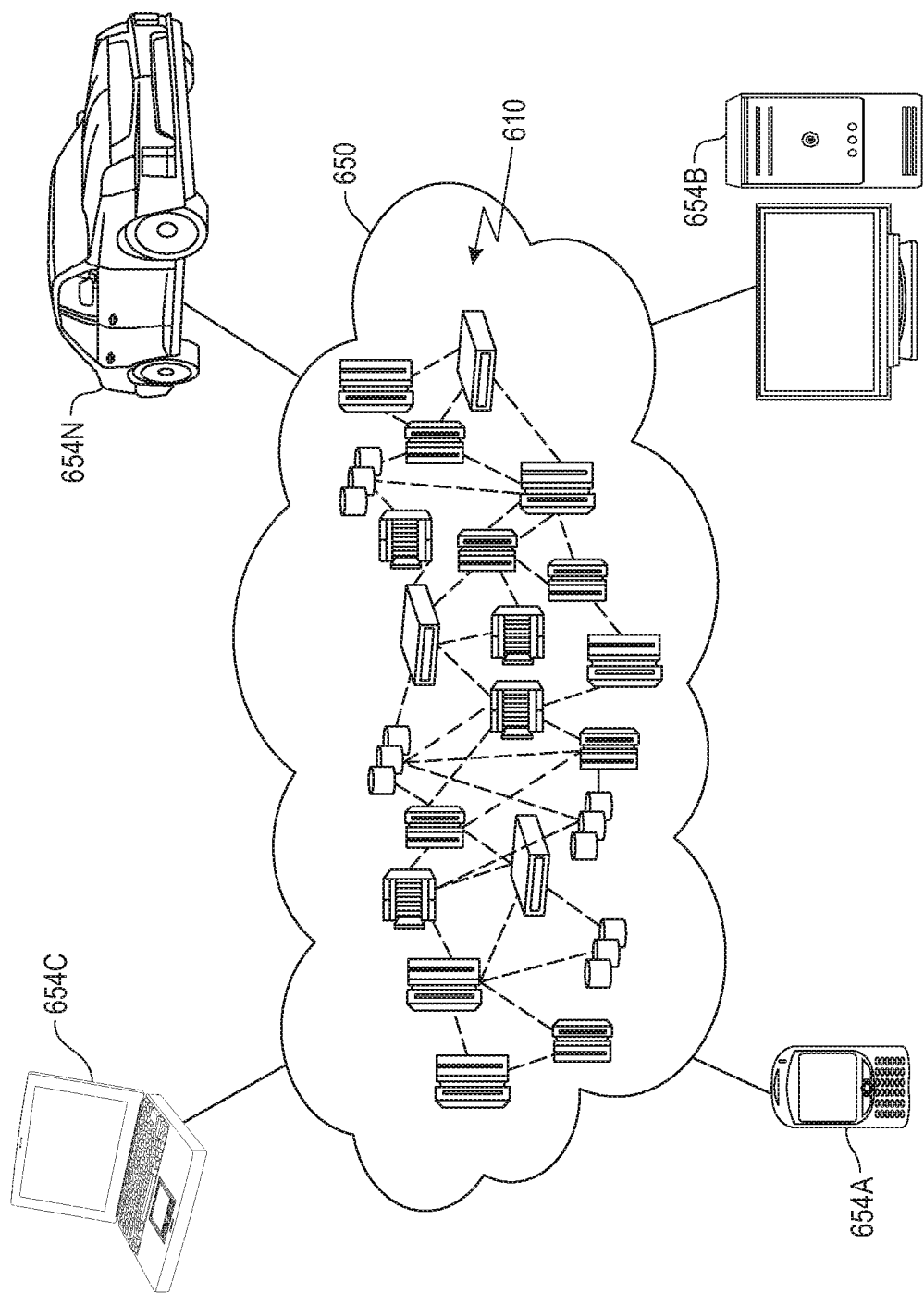
FIG. 6 depicts a cloud computing environment, according to an exemplary embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, a PDA or a cellular telephone 654A, a desktop computer 654B, a laptop computer 654C, and/or an automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
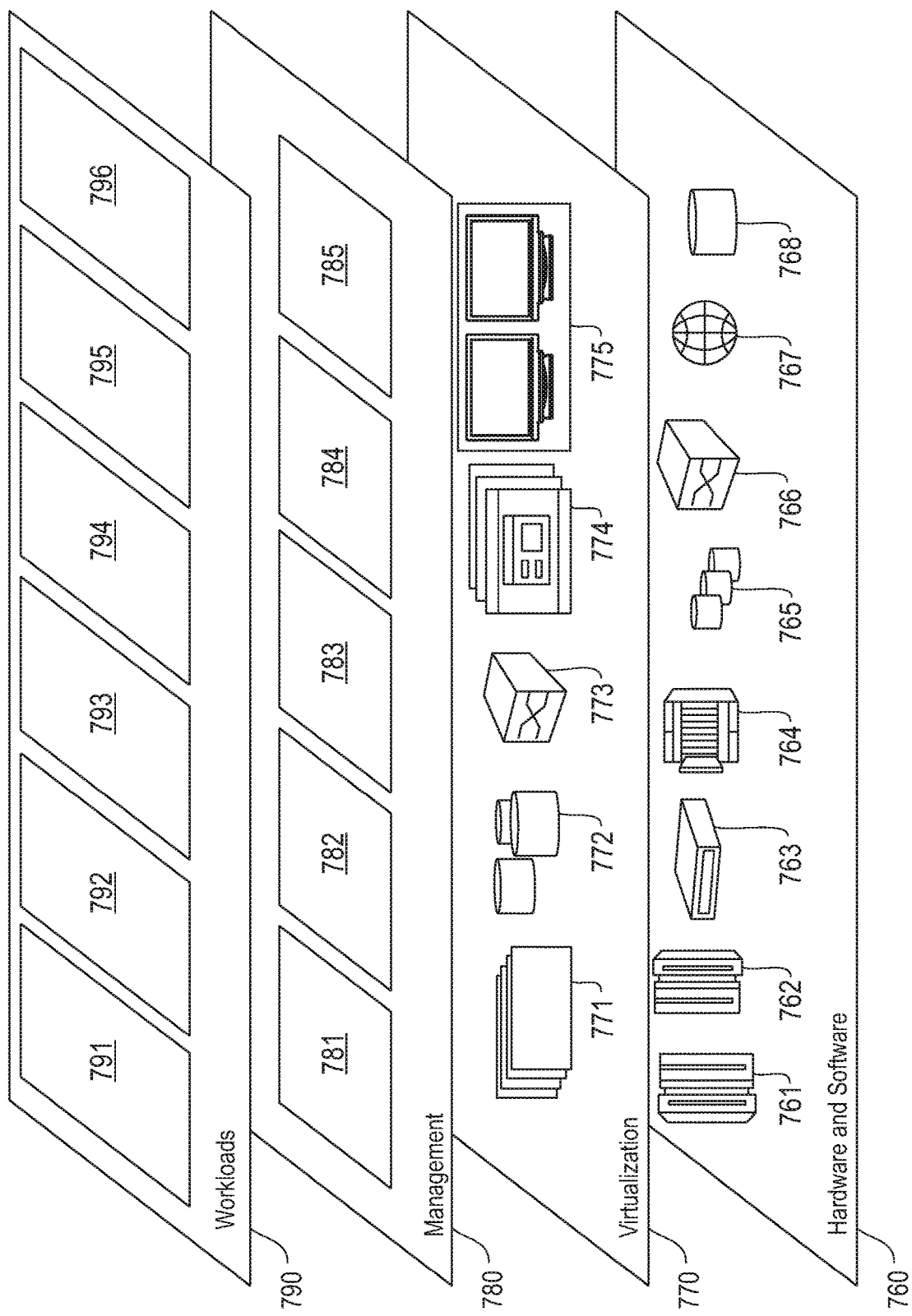
FIG. 7 depicts abstraction model layers, according to an exemplary embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and root cause analysis processing 796, which may perform various functions described above with respect to system 300.

Advantageously, embodiments of the present invention use provenance for root cause analysis in large scale data curation flows. Provenance paths/traces in connection with one or more data elements and/or one or more groups or sets of data elements are analyzed to identify potentially different data elements and/or curation rules and/or gaps in the curation process. Embodiments of the present invention also identify differences in the provenance paths associated with faulty and non-faulty records in order to identify the potentially faulty modules and/or rules that could have caused a data curation problem.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method, comprising:
computing a plurality of provenance paths for at least one of: a plurality of data elements in a curation flow and a plurality of groups of data elements in the curation flow;
analyzing the computed provenance paths to determine one or more errors in the curation flow;
wherein said analyzing comprises:
identifying which of the computed provenance paths are partial provenance paths; and
identifying (i) one or more output records comprising incorrectly curated data and (ii) one or more additional output records comprising correctly curated data;
determining that the one or more additional output records comprising the correctly curated data are similar to the one or more output records comprising the incorrectly curated data; and
identifying the computed provenance paths that respectively correspond to the one or more output records comprising the incorrectly curated data; and
outputting the one or more errors in the curation flow to at least one user.

2. The computer-implemented method of claim 1, wherein the plurality of provenance paths include a plurality of modules, and the plurality of modules each include one or more rules acting on at least one of the plurality of data elements and the plurality of groups of data elements.

3. The computer-implemented method of claim 2, wherein the plurality of provenance paths are based on a number of input data elements and a number of output data elements at each module of the plurality of modules.

4. The computer-implemented method of claim 2, wherein said analyzing comprises identifying the plurality of modules and the one or more rules that respectively correspond to the partial provenance paths.

5. The computer-implemented method of claim 4, wherein said analyzing comprises inspecting the partial provenance paths to identify one or more problems with at least one of the corresponding plurality of modules and the one or more rules.

6. The computer-implemented method of claim 5, comprising:
outputting the identified one or more problems and performing an error analysis on the identified one or more problems.

7. The computer-implemented method of claim 1, wherein said analyzing comprises identifying which of at least one of the plurality of data elements and the plurality of groups of data elements respectively correspond to the partial provenance paths.

8. The computer-implemented method of claim 7, wherein said analyzing comprises inspecting the partial provenance paths to identify one or more problems with at least one of the corresponding plurality of data elements and the plurality of groups of data elements.

9. The computer-implemented method of claim 8, comprising:
outputting the identified one or more problems and performing an error analysis on the identified one or more problems.

10. The computer-implemented method of claim 1, wherein said analyzing comprises identifying the computed provenance paths that respectively correspond to the one or more additional output records determined to be similar.

11. The computer-implemented method of claim 10, wherein said analyzing comprises comparing the computed provenance paths that respectively correspond to the one or more output records comprising the incorrectly curated data with the computed provenance paths that respectively correspond to the one or more additional output records determined to be similar.

12. The computer-implemented method of claim 10, wherein said analyzing comprises computing differences between the computed provenance paths that respectively correspond to the one or more output records comprising the incorrectly curated data and the computed provenance paths that respectively correspond to the one or more additional output records determined to be similar.

13. The computer-implemented method of claim 12, wherein:
the computed provenance paths that respectively correspond to the one or more output records comprising the incorrectly curated data include a plurality of modules, and the plurality of modules each include one or more rules acting on at least one of the plurality of data elements and the plurality of groups of data elements; and
said analyzing comprises identifying one or more problems with at least one of a module of the plurality of modules and a rule of the one or more rules based on the computed differences.

14. The computer-implemented method of claim 13, comprising:
outputting the identified one or more problems and performing an error analysis on the identified one or more problems.

15. A computer program product, the computer program product comprising a computer readable storage medium having program instructions embodied therewith, the program instructions executable by a device to cause the device to:
compute a plurality of provenance paths for at least one of a plurality of data elements in a curation flow and a plurality of groups of data elements in the curation flow;
analyze the computed provenance paths to determine one or more errors in the curation flow;
wherein said analyzing comprises:
identifying which of the computed provenance paths are partial provenance paths; and
identifying (i) one or more output records comprising incorrectly curated data and (ii) one or more additional output records comprising correctly curated data;
determining that the one or more additional output records comprising the correctly curated data are similar to the one or more output records comprising the incorrectly curated data; and
identifying the computed provenance paths that respectively correspond to the one or more output records comprising the incorrectly curated data; and
output the one or more errors in the curation flow to at least one user.

16. A system comprising:

a memory; and at least one processor coupled to the memory and configured for:

computing a plurality of provenance paths for at least one of a plurality of data elements in a curation flow and a plurality of groups of data elements in the curation flow;

analyzing the computed provenance paths to determine one or more errors in the curation flow;

wherein said analyzing comprises:

identifying which of the computed provenance paths are partial provenance paths; and identifying (i) one or more output records comprising incorrectly curated data and (ii) one or more additional output records comprising correctly curated data;

determining that the one or more additional output records comprising the correctly curated data are similar to the one or more output records comprising the incorrectly curated data; and identifying the computed provenance paths that respectively correspond to the one or more output records comprising the incorrectly curated data; and outputting the one or more errors in the curation flow to at least one user.

17. The system of claim 16, wherein:

the plurality of provenance paths include a plurality of modules, and the plurality of modules each include one or more rules acting on at least one of the plurality of data elements and the plurality of groups of data elements; and the at least one processor, in analyzing the computed provenance paths, is configured for identifying the plurality of modules and the one or more rules that respectively correspond to the partial provenance paths.

18. The system of claim 16, wherein in analyzing the computed provenance paths, the at least one processor is configured for identifying which of at least one of the plurality of data elements and the plurality of groups of data elements respectively correspond to the partial provenance paths.

\* \* \* \* \*